Jan. 25, 1949.   N. W. LYON   2,460,096
LINKING AND DELINKING MACHINE
FOR AMMUNITION BELTS
Filed Jan. 17, 1947   6 Sheets-Sheet 1
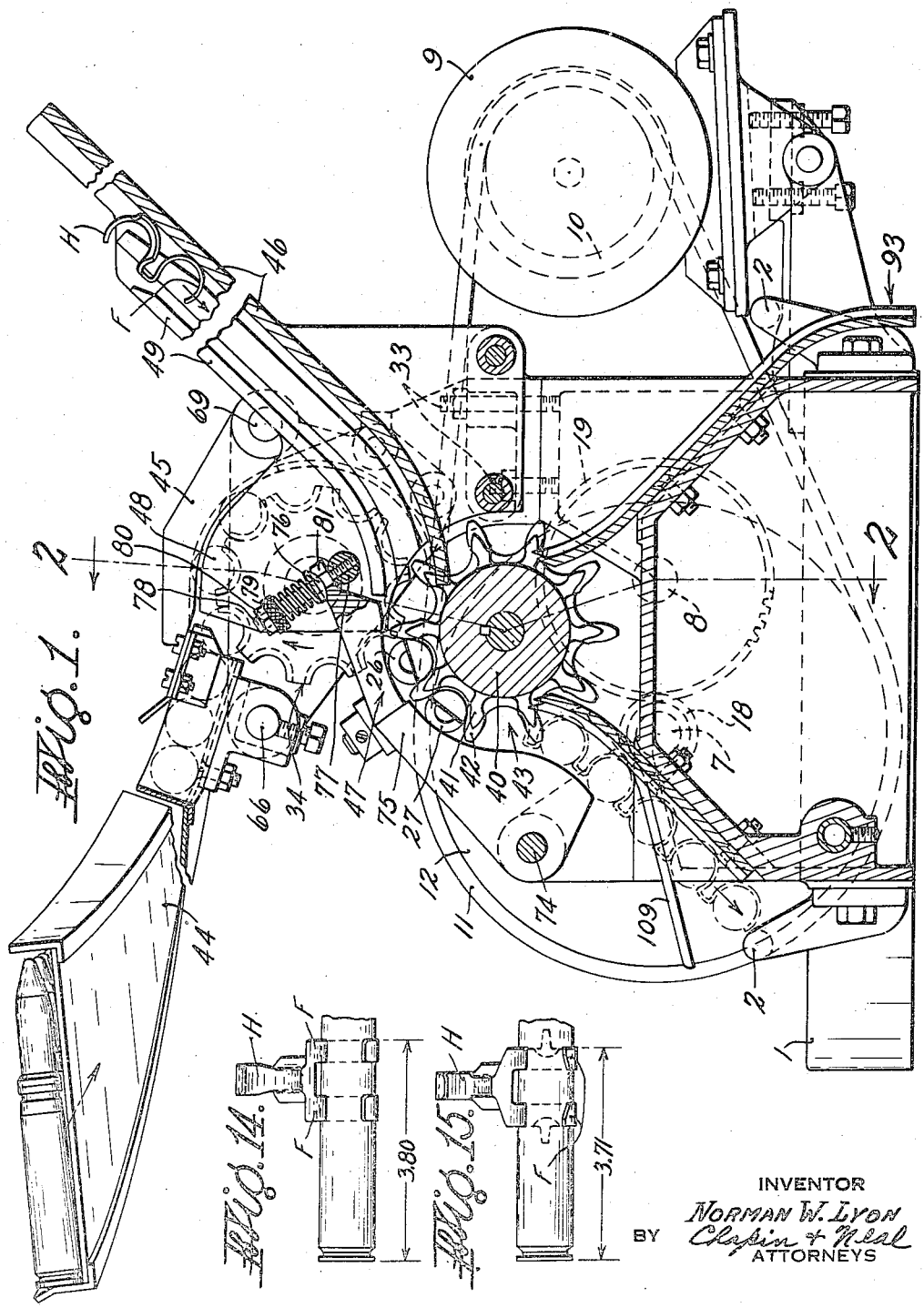
INVENTOR
Norman W. Lyon
BY Chapin + Neal
ATTORNEYS Jan. 25, 1949.  N. W. LYON  2,460,096
LINKING AND DELINKING MACHINE
FOR AMMUNITION BELTS
Filed Jan. 17, 1947  6 Sheets-Sheet 2
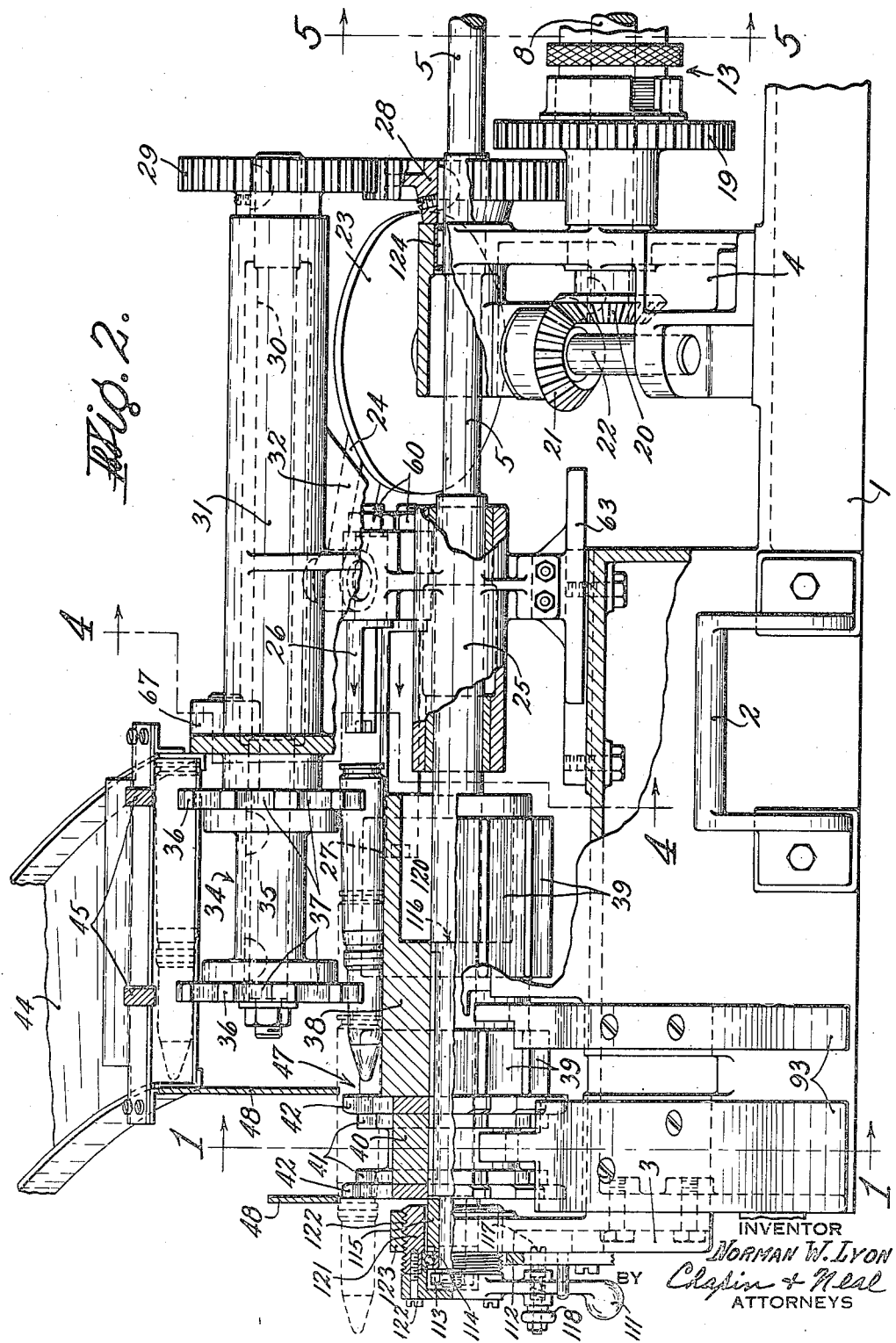

Jan. 25, 1949.　　　　　N. W. LYON　　　　2,460,096
LINKING AND DELINKING MACHINE
FOR AMMUNITION BELTS
Filed Jan. 17, 1947　　　　　　　　　　　　6 Sheets-Sheet 3
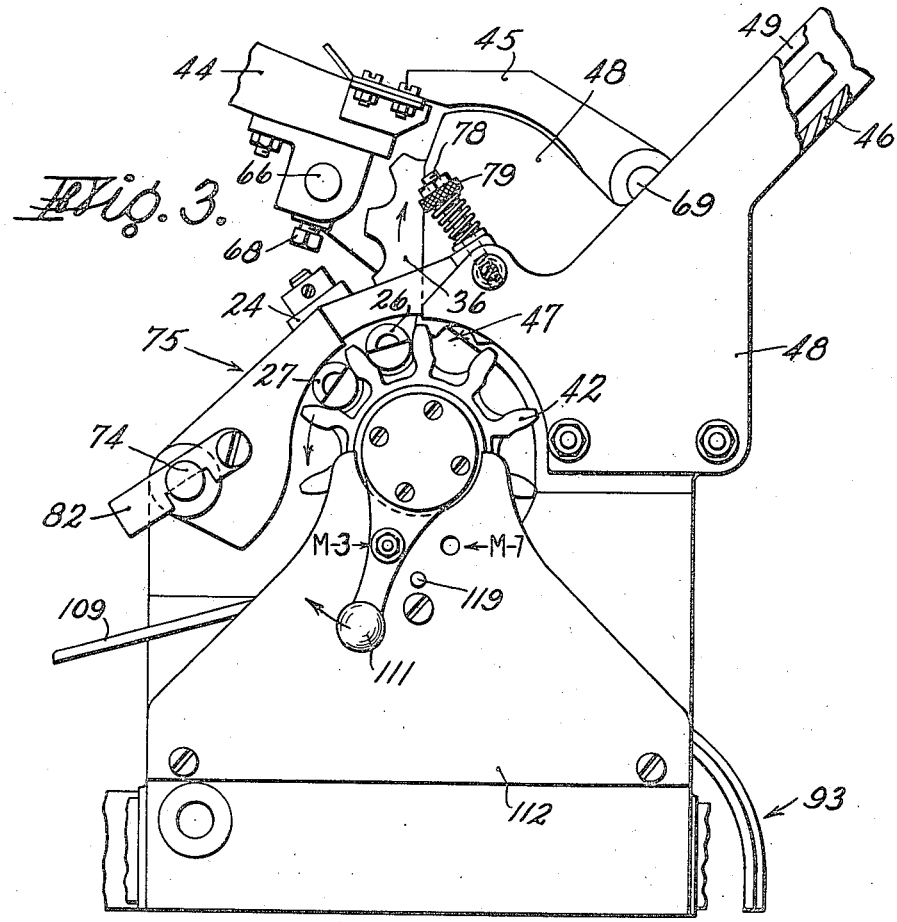
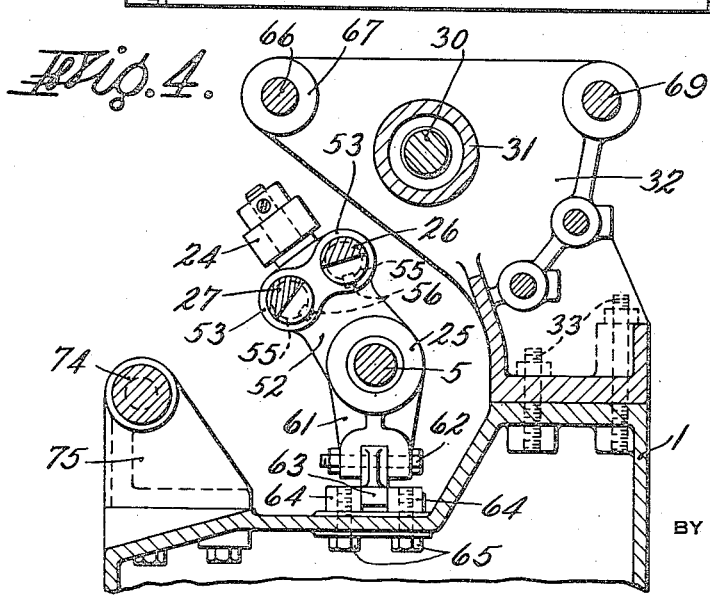
INVENTOR
NORMAN W. LYON
BY Chapin + Neal
ATTORNEYS

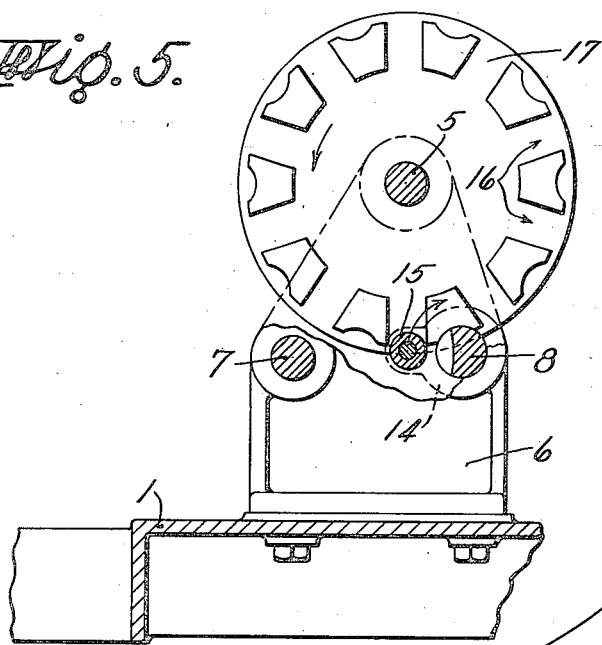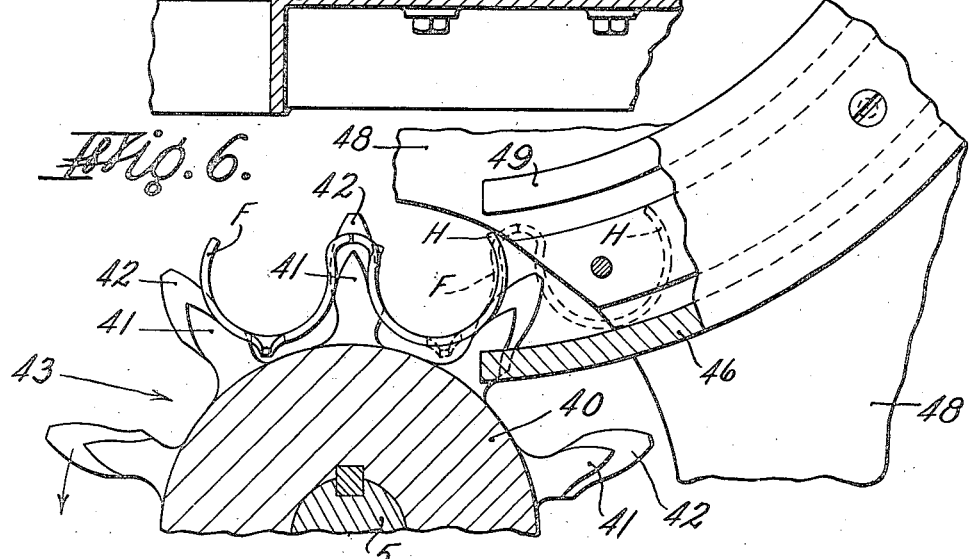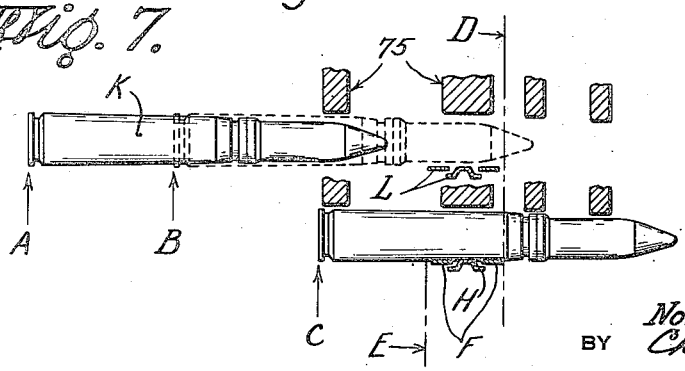

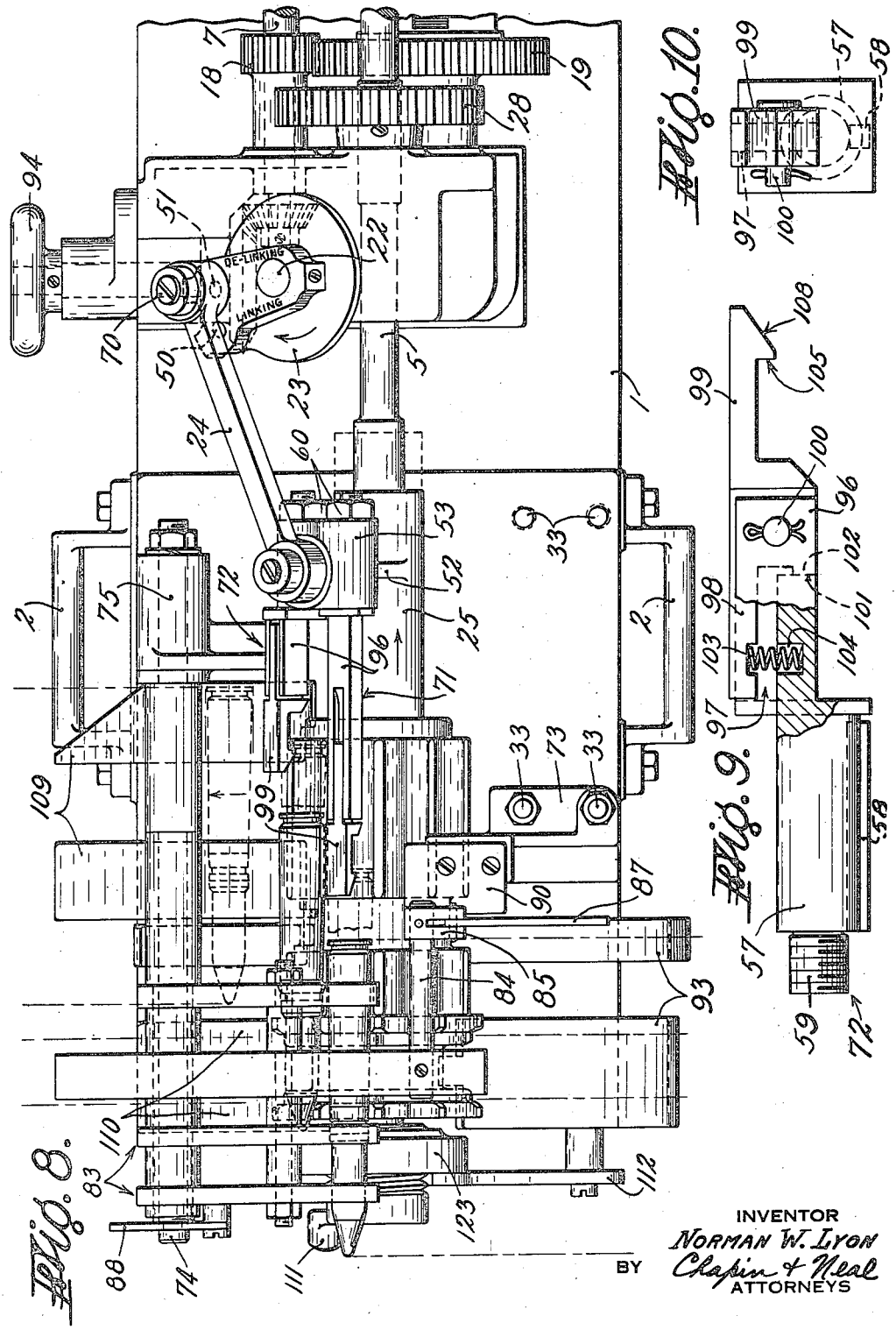

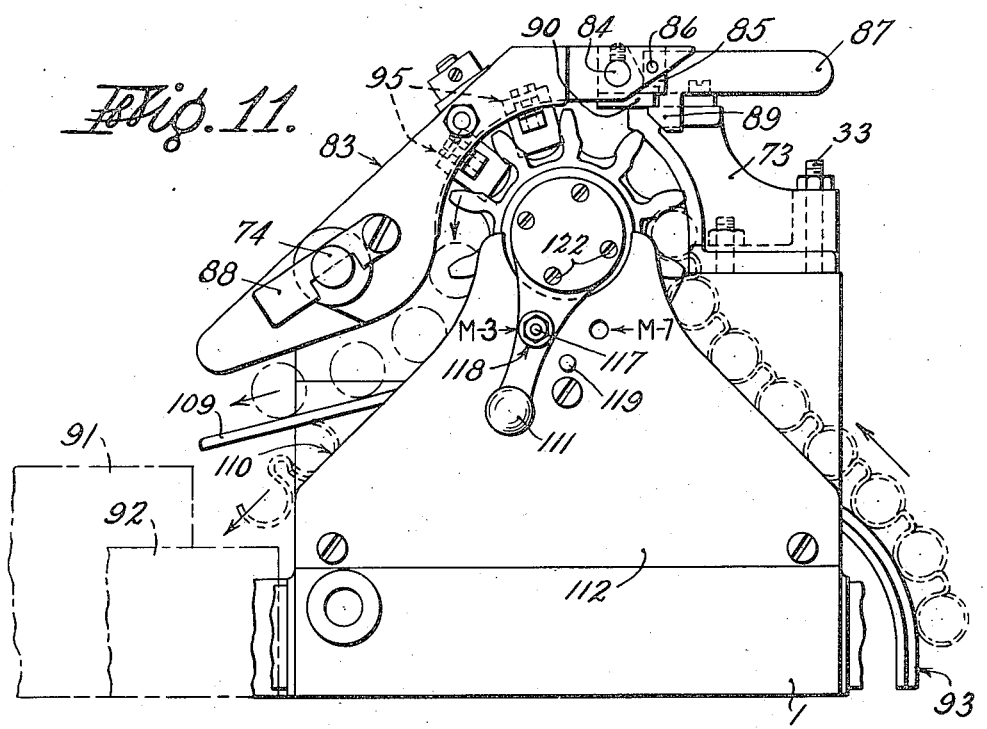
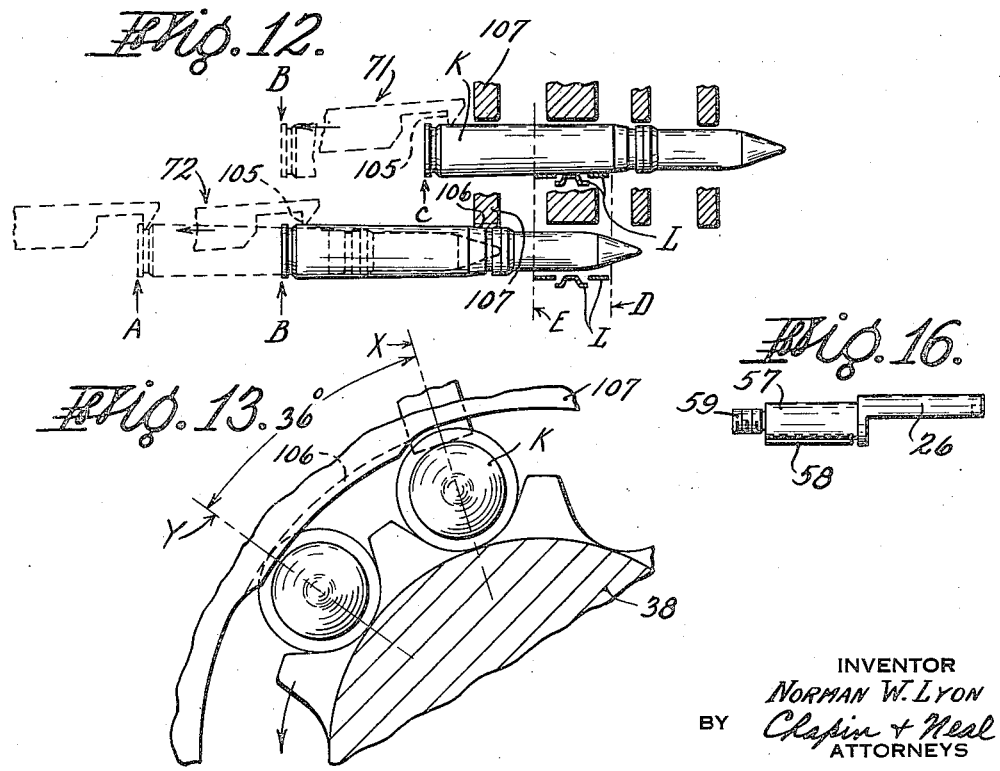

Patented Jan. 25, 1949

2,460,096

UNITED STATES PATENT OFFICE 2,460,096

LINKING AND DELINKING MACHINE FOR AMMUNITION BELTS

Norman W. Lyon, Springfield, Mass., assignor to Package Machinery Company, Springfield, Mass., a corporation of Massachusetts Application January 17, 1947, Serial No. 722,714

1 Claim. (Cl. 86—48)

This invention relates to machines of the type shown in the Smith and Wetsel Patent No. 2,372,399 issued March 27, 1945, for rapidly constructing link belt ammunition of the type used in automatic machine guns or the like and possesses certain improvements in construction and operation which will be pointed out in the accompanying specification and claim.

One object of the invention is the cartridge inserting mechanism which accomplishes the assembly of cartridges and links by successive strokes of the plunger carriage instead of one continuous stroke as in the patent referred to. As a result thereof a compact machine may be provided to care for a much larger cartridge than in said patent.

Another object of the invention is to adapt the machine, by interchanging a few parts, to either assembling cartridges with their respective links called the linking operation or disassembling the cartridges and links from a previously formed link belt, called the de-linking operation.

A further object is to provide an adjustment in the machine by which it may be employed for handling the linking or de-linking of M-3 or M-7 type of links with the 20 mm. cartridge. As hereinafter described the M-7 link is assembled with its cartridge in a position nearer the base of said cartridge than is the position of the M-3 link when assembled on the same size cartridge.

A more deailed description of the construction and operation of the machine will be found in the accompanying specification and drawings in which:

Fig. 1 is a partial sectional view taken through the link chute, link assembly wheel, de-linking infeed guide, and linking discharge guide showing the ammunition tray and cartridge feed wheel in the background as taken on line 1—1 of Fig. 2;

Fig. 2 is a partially sectioned elevational view taken substantially on line 2—2 of Fig. 1 through the link assembly wheel, loading wheel, and part of the drive mechanism;

Fig. 3 is a left hand end view of Fig. 2 with parts shown assembled for performing the linking operation of rounds of ammunition with type M-3 links;

Fig. 4 is a section taken on line 4—4 of Fig. 2 showing some of the removable linking mechanism which is replaceable by the de-linking mechanism;

Fig. 5 is a sectional detail view of the Geneva drive mechanism for rotating the loading wheel shaft as it would appear when viewed from the line 5—5 of Fig. 2 which construction is the same as shown in the Smith and Wetsel Patent No. 2,372,399 issued March 27, 1945;

Fig. 6 is a sectional detail view similar to that of Fig. 1 but drawn full scale and shows an M-7 link fully supported within the pockets of the link assembly wheel and another one in dotted lines interlocked and similarly supported making ready to receive a cartridge as a pintle;

Fig. 7 is a diagrammatic detail of steps taken by the linking plungers in assembling the rounds of ammunition with the links against a suitable abutment;

Fig. 8 is a partial top plan showing the machine equipped with the necessary parts for performing the de-linking operation;

Fig. 9 is a full size detail of one de-linking extractor with its hook attached;

Fig. 10 is a right hand end view of Fig. 9;

Fig. 11 is a left hand end view of Fig. 8 similar to Fig. 3, but with parts assembled for performing the de-linking operation of rounds of ammunition with type M-3 links;

Fig. 12 is a diagrammatic view, similar to Fig. 7, showing steps taken by the extractors and their hooks in disassembling the rounds of ammunition from the links with the aid of a suitable abutment;

Fig. 13 is a partial sectional detail of the cartridge loading wheel shown supporting two rounds and also shows the specially beveled guide past which the rounds are intermittently indexed during the process of de-linking;

Figs. 14 and 15 show the proper location of the two different type links respectively on the same type cartridge necessary for accurate alignment in machine guns; and Fig. 16 is a small scale detail of the shortest interchangeable plunger unit.

This machine has a comparatively small base I upon which is mounted the entire mechanism. Handles 2 are conveniently placed at each s'de of said base for ease in carrying it about. Brackets 3 and 4 are mounted upon base I and support suitable bearings upon which loading wheel shaft 5 is mounted for lateral and rotatable movement therein. A bracket 6 which is mounted at the extreme end of base I (Fig. 5) acts in conjunction with bracket 4 to support the motor drive pulleys, clutch, and Geneva drive mechanisms which are mounted on shafts 7 and 8 between said support brackets.

The driving mechanism is the same used in the Smith and Wetsel patent earlier referred to and consists of a motor 9 provided with a standard make variable drive pulley 10 which drives main shaft 7 by a belt 11 and drive pulley 12 mounted thereon (Fig. 1). Shaft 8 possesses a clutch mechanism 13 to control a Geneva crank 14 at the other end which rotates continuously when said clutch is engaged. A Geneva crank roll 15, carried on Geneva crank 14, engages radial slots 16 of a ten point Geneva gear 17 secured to shaft 5 and therefore imparts intermittent motion to loading wheel shaft 5 during the machine's operation. Main shaft 7 possesses a driving pinion 18 which constantly drives gear 19 loosely mounted on shaft 8 and rigidly secured to the driving member of clutch 13. Shaft 8 is journaled in a bearing in bracket 4 and has a bevel gear 20 keyed to its extreme left end, on the other side of said bearing, which engages a bevel gear 21 secured to an angularly disposed shaft 22 mounted in suitable bearings in bracket 4. At the uppermost end of shaft 22 is secured a disc 23 in the form of a crank member which carries linking and de-linking crank pin holes therein. A connecting rod 24 extends from said crank disc 23 to a plunger carriage 25, slidably mounted on loading wheel shaft 5, for reciprocating said carriage back and forth on said loading wheel shaft. Plunger carriage 25 supports two interchangeable pushers 26 and 27, one respectively shorter than the other, each of which possess pusher heads for contacting the bases of the cartridges.

A gear 28 keyed to loading wheel shaft 5 intermittently rotates therewith and drives another gear 29 which is keyed to a cartridge feed wheel shaft 30 suitably journaled in bearings in a long cylindrical portion 31 of the detachable linking mechanism bracket 32 interchangeably mounted on studs 33 secured to base 1. A cartridge feed wheel 34 comprises a flanged central hub portion 35 with twin segments 36 secured thereto in spaced relation sufficient to support a cartridge between them in the equally spaced radial pockets 37 on the periphery of each segment. Said hub 35 is keyed to the extreme end of shaft 30 and is intermittently rotated therewith.

Intermittently rotating shaft 5 has keyed thereto a loading wheel 38 comprising equally spaced radial pockets 39 on its periphery to receive cartridges from the cartridge feed wheel 34 rotating in the opposite direction directly above. Also keyed to shaft 5 on the same keyway as loading wheel 38 and adjacent thereto is the link assembly wheel 40 in the form of a pocket wheel comprising spaced sprockets 41 flanked by larger sprockets 42 and rigidly secured thereto. The extreme width of sprockets 42 is slightly larger than the width of the links. Said sprockets 41 and 42 each comprise equally spaced radial pockets 43 around their circumferences to receive the links from the link chute, to be described later.

Pockets 43 in the link assembly wheel 40 are always in axial alignment with pockets 49 in the loading wheel 38 and are simultaneously carried on shaft 5 and intermittently rotated therewith. Gears 38 and 39 are marked for proper timing when bracket 32 is placed on the machine for the linking operation as shown set up in Fig. 2, thereby insuring the proper transfer of cartridges from the feed wheel pockets to the pockets of the loading wheel for accurate axial alignment with links confined within the pockets of the link assembly wheel 40.

The cartridge feed mechanism consists of an inclined ammunition tray 44 the lower end of which lies adjacent the cartridge feed wheel pockets 37 (Fig. 2) where said cartridges move by gravity from said tray 44 to said pockets 37. The operator places the cartridges in the tray with their noses pointing toward the right as shown in Fig. 1 so that they will be facing towards the links when they arrive at the assembly station as seen in Fig. 2. Suitable arcuate guides 45 confine said cartridges within said feed wheel pockets 37 during their travel to the loading wheel 38 directly below.

As the cartridges are being delivered one by one to the assembly station as described above, the operator also places the desired type of links, M-3 or M-7, into the link chute 46 where they also slide by gravity to the assembly station 47 to be united with the cartridges which will be described later. The link chute possesses sides 48 (Figs. 1, 2, and 3) to confine said links and a top member 49 to insure their proper entrance into the pockets 43 in sprockets 41 and 42 where they interlock and make ready to receive the cartridges as pintles to form the link belt ammunition.

Referring to Figs. 14 and 15, both types of links are shown. Type M-3 is shown in Fig. 14 and has no lugs projecting from it, while type M-7 (Fig. 15) has a lug projecting from each of the two aligned loops. Either type of link must be placed in the chute by the operator "feet first." Each link has three loops or rings. Loops F constitute the "feet" and loop H the "head." Loop H is slightly larger in diameter than the other two. Loops F are axially aligned and are of sufficient diameter to tightly hold a cartridge in its proper place. Loop H is located between and centrally above loops F (Figs. 14 and 15) so that as said links interlock at the assembly station 47, loops F will straddle loop H and become properly aligned for the entrance of a cartridge, whereby said links will be connected together by said cartridge acting as a pintle. The M-3 type is shown sliding down the link chute 46 in Fig. 1 and the M-7 type is show in interlocking relationship in Fig. 6 and properly supported within the pockets 43 formed by sprockets 41 and 42 of the link assembly wheel. Ample space has been provided at the bottom of pockets 43 for the projecting lugs on M-7 links (Fig. 6), and it will be noted that sprockets 41 support the links by their loops while sprockets 42 confine said links between them and form sufficient abutments for said links while the cartridge is being pushed into or pulled from within them during the linking or de-linking operations respective, which action will be described.

For the linking operation the machine is assembled as shown in Figs. 1 through 7. The cartridges are transferred one by one into the pockets 39 of the loading wheel 38 and are held in axial alignment with interlocked links confined within the pockets 43 of the link assembly wheel 40. Plunger carriage 25 is reciprocated by the crank motion of crank disc 23 through the connecting rod 24 secured to said carriage. Disc 23 carries linking and de-linking crank pin holes 50 and 51 respectively from which connecting rod 24 is driven. Referring to Figs. 2 and 4, there is projecting from the uppermost portion of plunger carriage 25, and at an angle thereto, a web 52 which carries a double boss structure 53. Each boss 53 is bored and key slotted at 55 and 56 respectively to receive shanks 57 and keys 58 of the interchangeable cartridge plunger and extractor devices (Figs. 16 and 9 respectively). A shouldered portion 59 on each device is threaded to receive a nut 60 (Fig. 2) for rigidly securing said plunger or extractor within bores 55 of said boss member 53. To a downwardly extending web portion 61 (Fig. 4) integral with plunger carriage 25 is secured by bolts 62 a short slide bar 63 which slides between ways 64, rigidly secured to base 1 by bolts 65, which guides carriage 25 in a vertical plane eliminating any tendency for said carriage to rotate about the axis of shaft 5 during its reciprocatory travel. Slide bar 63 is made the same length as ways 64 so that wear will be reduced to a minimum.

The 20 mm. cartridge for which this machine is especially designed to handle is considerably longer than the average cartridge. Two plungers 26 and 27, each delivering a short stroke, have been employed to complete the forward travel of the cartridge to its rest position within the links. The uppermost plunger 26, carried by the reciprocating plunger carriage 25 first pushes the cartridge half the length of its travel within its aligned links. The carriage then retracts and at the same time the loading wheel 38 carrying the cartridge and the link assembly wheel 40 carrying the links is indexed 36° with shaft 5 by the Geneva drive mechanism which places the cartridge and links in axial alignment with the second or lowermost plunger 27 on carriage 25. The carriage advances again and the plunger 27 contacts the butt end of the cartridge and pushes it the final distance within the links. During this same time the uppermost plunger 26 is imparting the first part of a complete stroke on the succeeding cartridge and this cooperative action takes place during the intermittent rotation of shaft 5 and the simultaneous reciprocation of plunger carriage 25. Plungers 26 and 27 are sufficiently relieved on their pushing surface to avoid contact with the priming caps of the cartridges during their pushing action.

A clearer understanding of the linking action just described may be gained by referring to the diagrammatic showing in Fig. 7 as if viewed from the left of Fig. 1 with the plungers moving toward the right. The first stroke of the plungers causes the uppermost plunger 26 to contact and push the base of cartridge K from point A to B shown in dotted lines on the drawing. This is one-half of the total distance the cartridge will travel. The loading wheel then indexes 36° in a counterclockwise direction as viewed from Fig. 1 and the pusher carriage retracts. The carriage advances again and the lowermost and longest pusher 27 contacts the butt end of the cartridge and pushes the same from point B to its rest position C within its respective links L, completing its forward travel. Line D represents the inside face of large sprocket 42 against which the links bear (Fig. 6) as the cartridge is forced into loops F as explained earlier. Line E represents the opposite inside face of sprocket 42 against which the links bear as the cartridges are extracted from within said loops F which action is known as de-linking and will now be described.

To set the machine up for the de-linking operation some linking mechanism parts must be removed by the operator and some exchanged with others. The ammunition tray 44 is removed from its supporting stud shaft 66 which projects from boss 67 integral with linking mechanism bracket 32 by loosening set screw 68 and pulling said tray 44 off said stud shaft 66 (Figs. 1, 3 and 4). A standard is employed to support the elevated end of said ammunition tray but is not shown on the drawing for convenience.

Next, remove linking mechanism bracket 32 from the four studs 33 which includes the cartridge feed wheel 34 and its drive gear 29 and also a supporting stud shaft 69 upon which is mounted cartridge infeed guides 45. Remove the two cartridge pushers 26 and 27 by loosening units 60 and pulling same from within double boss structure 53. Next remove connecting rod 24 from crank pin hole 50 and shift crank pin 70 to the de-linking hole 51 in crank disc 23 as shown in Fig. 8. This change takes care of the difference in stroke and timing required for the de-linking operation.

Insert the longest extractor 71 in the uppermost boss 53 on plunger carriage 25 and the shortest one 72 in the lowermost position and tightly secure same in place by nuts 60. The keys 58 permanently fixed to the shanks 57 of each replaceable unit insures its proper alignment. Attach the de-linking guide support bracket 73 to the first two studs 33 nearest the loading wheel 38 (Fig. 8).

Linking and de-linking discharge channel guide units are interchangeably mounted on the shouldered portion of a long stud shaft 74 rigidly supported from a bracket 75 mounted on base 1 (Fig. 8). Linking guides 75 fastened together as a unit consist of one central wide member and three narrower pieces. The central member possesses a quick detachable means in the form of a spring pressed convex button 76 which rests in a concave recess in said central guide member. A cross rod 77 rotatably mounted between link chute sides 48 has extending therefrom a short stud 78 upon which button 76 is slidably mounted. The upper end of stud 78 is threaded to receive a knurled tension adjusting knob 79 and a lock nut 80. A slot 81 is provided in the central guide member for the entrance or exit of stud 78 whereby the operator grasps the knurled portion 79 and rotates it clockwise (Fig. 1) to cam the convex button 76 up over the slotted end of the central guide and release said guide for removal from the machine as a unit. A notched keeper 82 pivoted on the first guide member of the group coincides with a notch in the support shaft 74 to confine the lower ends of said guides on said support shaft and said keeper must be lifted by the operator which enables him to remove the linking guides as a unit by sliding them off the support shaft 74. These guides are now removed and replaced by de-linking guides 83 also assembled as a unit for quick interchanging with the linking guides, as explained herewith.

The de-linking guide unit 83 is similarly constructed of one wide member and three narrower pieces with the spacing between them slightly different. Said unit 83 is also supported from stud shaft 74 at its lower end while its upper end has a quick detachable latch mechanism consisting of a short cross rod 84 secured in the widest piece, and carries on its other end a forked block 85 which has pivoted to it at 86 within said forked portion, a combination latching and lifting handle 87. The de-linking guide unit 83 is placed on long stud shaft 74 and locked into place by another keeper 88 pivoted from the outermost guide member and placed within a notch at the extreme end of said shaft 74 (Figs. 8 and 11). Block 85 rests upon the uppermost portion of the de-linking guide support bracket 73 and hook portion 89 of handle 87 latches under the supporting projection 90 on said support bracket 73. Thus the de-linking guide unit 83 is now installed in place of the linking guide unit 75 to guide the cartridges and their respective links into receptacles 91 and 92 respectively after they have been disassembled, which action will now be described.

The machine is now ready for performing the de-linking operation shown in Figs. 8 through 13. At this point the operator should verify the position of the adjusting handle 111 to make certain said position conforms to the type of links to be disassembled.

The assembled link belt ammunition is placed upon the de-linking infeed channel 93 by the operator. He then operates a hand wheel 94 until the first cartridge and its respective links in the belt, generally shown in dotted lines in Fig. 11, are in mesh with the radial pockets of the loading wheel 38 and link assembly wheel 40 respectively. Guide bracket 73 confines said cartridges and links within said pockets during their arcuate travel to the de-linking station 95 where they will be acted upon by reciprocating extractors carried by the plunger carriage 25.

The extractors (Fig. 9) are constructed to deliver a definite gripping action on the rim of each cartridge to pull it from within the grip of its respective links. To acquire this, said extractors are constructed of solid square stock 96 centrally slotted at 97 a sufficient width to receive the rear portion 98 of a latch 99 pivoted to said square portion on a pin 100. Formed within slot 97 is an abutment 101 against which a stop portion 102 of latch 99 is normally yieldably held. A compression spring 103 is mounted within a recess 104 of said square stock 96 to push against the underside of tail portion 98 and normally hold latch 99 in the rest position shown in Fig. 9. Said latch 99 possesses a hook portion 105 with which said cartridges are pulled, as will be explained. As stated earlier in the description, each extractor possesses a shank 57 which is integral with the body portion 96 and a key 58 integral with said shank for quick and accurate alignment when placed within the bores 55 in double boss structure 53 on the reciprocating plunger carriage 25 when replacing plungers 26 and 27. Fig. 9 shows the shortest extractor of the two, No. 72. The other one differs only by a longer body portion 96 as seen in Fig. 8.

Referring to the drawings (Figs. 8, 12 and 13), the de-linking action of the extractors may be more clearly understood by the diagrammatic showing in Fig. 12 which represents the de-linking station 95. Cartridge K is shown in its normal position within its respective links L in a link belt and supposedly resting within the pockets 39 of loading wheel 38 and pockets 43 in the link assembly wheel 40 respectively, neither of which are shown for clearness, ready to be disassembled. Both extractors 71 and 72 are shown in dotted lines at the extreme forward part of their stroke and ready to return simultaneously in the direction of the arrows. The hook portion 105 of each extractor will contact the rim of a cartridge and pull it along. Considering the path taken by one cartridge K, it is pulled by the uppermost extractor 71 from position C to the dotted line position at B completing the first part of the extractor's stroke. As the extractor reaches position B with the cartridge, the loading wheel 38 which is supporting said cartridge is indexed 36° in the direction of the arrow (Fig. 13) and carries cartridge K from position X to position Y and stops. During this indexing movement, the rim of cartridge K is moved out of contact with the hook 105 of the extractor 71 causing a halt in the lateral travel of said cartridge at position B.

During the indexing of the loading wheel from one rest position to the other (X to Y) said cartridge K is moved behind an arcuate beveled portion 106 formed on the outermost guide 107 of the de-linking guide unit 83. The cartridge is left by the extractor and moved by the indexing of loading wheel 38 simultaneously behind said beveled portion 106 after the first half of the complete extractor stroke so as to confine the cartridge and give it something to bear against with the beveled shoulder portion of the cartridge shell (Figs. 12 and 13).

The extractors advance again on the second part of their complete stroke and the beveled portion 108 of extractor 72 rises up over the rim of the cartridge at position B to reach the extreme forward end of its stroke as before. The beveled guide 106 prevents any forward movement of said cartridge as said extractor hook rides up over its rim. Said cartridge is lying comparatively free within the pocket of loading wheel 38 at this moment (not shown) and not held tightly within its respective links L as before. Said links L are also lying comparatively free within a pocket 43 of link assembly wheel 40. The extractor 72 moves back to complete the second part of its stroke and contacts the rim of the cartridge and moves it from position B to A. During this last part of the stroke the Geneva indexes 36° again, as explained before, and this time the cartridge rim is moved out of contact with the hook 105 of extractor 72 and allows said cartridge to roll down the discharge channel plates 109 into a container 91. Simultaneously as the nose of the cartridge is pulled from within the links confined in pocket 43 they also slide down the discharge channel plates 110 into a container 92.

As the cartridge is pulled by the extractor from within its respective links, said links bear against the inside face of large sprocket 62 of the link assembly wheel 40, represented on the diagrammatic drawing Fig. 12 by line E, which prevents their lateral travel along with said cartridge, the same as described during the linking operation.

Provision has been made for the machine to care for the linking or de-linking of cartridges with either of two style links, namely the M-7 or the M-3. An adjustment changes the lateral position of the links in the machine in relation to the fixed plunger carriage stroke which positions the cartridge within said links. It consists of a handle 111 which is moved by the operator either to the M-3 or M-7 position clearly marked on the left hand end plate 112 of the machine (Figs. 3 and 11). Figs. 14 and 15 show the different measurements required pertaining to the relative positions of each type link upon its respective cartridge for accurate alignment of either specific link belt within a machine gun. The required measurement from the butt end of the cartridge to the outermost edge of the link is 3.80 inches for the M-3 type having no lugs, and 3.71 inches for the M-7 type with lugs, as shown in Figs. 14 and 15. The cartridges for the different type links are of the same size and shape, namely the 20 mm. size.

A nut 113 threaded onto the extreme left hand end of loading wheel shaft 5 (Fig. 2) tightly secures a ball bearing 114 between a sleeve 115 which bears against the outside surface of link assembly wheel 40 adjacently aligned on the same keyway in said shaft 5 as loading wheel 38 thereby forcing said loading wheel against a shoulder abutment 116 on shaft 5 to secure these several parts together as a unit.

To move the handle 111 from M-3 position to the other, the operator must release the spring pressed detent 117 by pulling out on knob 118 and then by moving the handle clockwise to the M-7 position (Fig. 11). A stop pin 119 prevents handle 111 from being moved in the wrong direction. When said handle 111 is moved as just described, shaft 5 which carries loading wheel 38 and link assembly wheel 40 is moved in a longitudinal manner within the machine. Loading wheel 38 is hollowed out at 120 a sufficient amount to allow continuously reciprocating plunger carriage 25 to complete its fixed stroke upon shaft 5 without interference. Therefore, by this lateral adjustment of the link assembly wheel in relation to the fixed plunger stroke, cartridges may be positioned within either type links as required.

To accomplish the longitudinal movement of shaft 5 a threaded sleeve 121 is mounted for rotation on threads 122 in hub 123 of end bracket 3 secured to base 1. Handle 111 is secured by screws 122 to said sleeve 121 which carries the outer race of ball bearing 114 therein, thereby rotatably supporting the left hand end of loading wheel shaft 5 for longitudinal movement upon said threads at this end and on a needle bearing 124 suitably mounted in bracket 4 at the right hand end as seen in Fig. 2.

The drawing shows the machine set up to link or de-link cartridges with M-3 links confined between the respective sides of link assembly wheel 40. With the handle placed in the M-7 position just described, the M-7 links within said link assembly wheel will be moved laterally nearer the fixed stroke of the reciprocating plunger assembly whereby the cartridges will not be pushed into the M-7 links so far as with the M-3 adjustment therefor acquiring the desired 3.71 dimension from the butt of said cartridge to the extreme outer edge of the link as desired.

An additional adjustment has been provided for precisely positioning links of either type upon their respective cartridges by removing screws 122 and then rotating handle 111 to the right or left at intervals of 90° and replacing said screws which will result in a very accurate adjustment.

In the mechanism described, return springs for the working parts are not employed. Thus there is no resistance load to be overcome in the operation of the machine except the exertion needed for inserting of the cartridges into their respective links during the linking operation and also the separation of said cartridges from said respective links during the de-linking process, two of said cartridges being processed at one time. To maintain a high rate of production the operator needs only to set up and properly adjust the machine for the operation desired with links of proper character and keep the link chute and ammunition tray filled with material and the specific link belt ammunition will be produced.

Having disclosed my invention, what I claim is:

In a machine of the class described, a cartridge loading wheel, cartridge feed means to direct cartridges into said loading wheel, a link assembly wheel formed with link holding pockets around its periphery and having a step by step rotating movement, link feed means to direct links into said assembly wheel, a reciprocating plunger carriage having a fixed stroke, a pair of plungers mounted in said carriage in spaced circumferential positions with respect to the axis of said link assembly wheel, one of said plungers being longer than the other and said two plungers having their reciprocatory paths respectively in line with successive pockets on the periphery of said link assembly wheel, whereby said plunger carriage with its plungers may perform an operational action on the cartridges with respect to links in said assembly wheel in two successive stages during the step by step rotation of said wheel.

NORMAN W. LYON.

REFERENCES CITED

The following references are of record in the file of this patent:

UNITED STATES PATENTS

| Number | Name | Date |
| --- | --- | --- |
| 2,372,399 | Smith et al. | Mar. 27, 1945 |
| 2,415,561 | Jervey | Feb. 11, 1947 |
| 2,432,398 | Edson et al. | Dec. 9, 1947 |